US012301135B2

(12) United States Patent
Wu et al.

(10) Patent No.: US 12,301,135 B2
(45) Date of Patent: May 13, 2025

(54) PHASE AND AMPLITUDE IMPROVING METHOD AND SYSTEM THEREOF

(71) Applicant: NATIONAL TSING HUA UNIVERSITY, Hsinchu (TW)

(72) Inventors: Tsai Fu Wu, Chia-Yi (TW); Yun Hsiang Chang, Miaoli (TW); Jui Yang Chiu, New Taipei (TW); Chien-Chih Hung, Taipei (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 71 days.

(21) Appl. No.: 18/226,429

(22) Filed: Jul. 26, 2023

(65) Prior Publication Data

US 2024/0283375 A1 Aug. 22, 2024

(30) Foreign Application Priority Data

Feb. 17, 2023 (TW) ................. 112105737

(51) Int. Cl.
*H02M 7/539* (2006.01)
*G05B 13/04* (2006.01)
*H02M 1/00* (2006.01)
*H02M 7/5387* (2007.01)

(52) U.S. Cl.
CPC .......... *H02M 7/539* (2013.01); *G05B 13/045* (2013.01); *H02M 1/0025* (2021.05); *H02M 7/53873* (2013.01)

(58) Field of Classification Search
CPC ...... H02M 7/539; H02M 7/5395; H02M 7/54; H02M 7/5387; H02M 7/53871; H02M 7/53873; H02M 1/0025
See application file for complete search history.

(56) References Cited

U.S. PATENT DOCUMENTS

| 2012/0224403 | A1* | 9/2012 | Wu | ............. H02M 7/5395 363/132 |
| 2016/0065049 | A1* | 3/2016 | Wu | ............. G01R 31/40 702/65 |
| 2021/0152101 | A1* | 5/2021 | Tsuruma | ............. H02M 7/53871 |

OTHER PUBLICATIONS

Tsai-Fu Wu et al., "Three-phase Four-wire Voltage Converter with D-Σ Control and Phase-Amplitude Compensation", 11th International Conference on Power Electronics (ICPE 2023-ECCE Asia), dated on May 22-25, 2023, poster presentation, Korea.

* cited by examiner

*Primary Examiner* — Nguyen Tran
(74) *Attorney, Agent, or Firm* — CKC & Partners Co., LLC (57) ABSTRACT

A phase and an amplitude improving method includes performing a model establishing step, a phase compensating step, an amplitude compensating step and a compensation information generating step. The model establishing step includes establishing an inverter model. A voltage command is inputted to the inverter model to generate an actual voltage information. The voltage command includes a phase command information and an amplitude command information. The phase compensating step includes computing the phase command information and the actual voltage information to generate a compensating phase information. The amplitude compensating step includes computing the amplitude command information and the actual voltage information to generate a compensating amplitude information. The compensation information generating step includes generating a compensating voltage command. The compensating voltage command is inputted to the inverter model to generate a compensating actual voltage information.

10 Claims, 12 Drawing Sheets

PHASE AND AMPLITUDE IMPROVING METHOD AND SYSTEM THEREOF

RELATED APPLICATIONS

This application claims priority to Taiwan Application Serial Number 112105737, filed Feb. 17, 2023, which is herein incorporated by reference.

BACKGROUND

Technical Field

The present disclosure relates to a phase and an amplitude improving method and a system thereof. More particularly, the present disclosure relates to a phase and an amplitude improving method and a system thereof for an inverter.

Description of Related Art

In the general controlling technique of the voltage inverter, a voltage command can be inputted to a simulating inverter to generate a simulating output voltage of the inverter. However, due to a limitation of the system bandwidth, the phase and the amplitude of the output voltage is shifted when the output voltage is at high frequency, and a waveform of the output voltage may be distorted. Thus, there is a large error between the distorted output voltage and a phase and an amplitude of the voltage command.

Therefore, a phase and an amplitude improving method and a system thereof which can estimate the phase and the amplitude of the output voltage, respectively, and correspondingly adjusted the voltage command are commercially desirable.

SUMMARY

According to one aspect of the present disclosure, a phase and an amplitude improving method includes performing a model establishing step, a phase compensating step, an amplitude compensating step and a compensation information generating step. The model establishing step includes configuring a processor to establish an inverter model corresponding to an inverter circuit. A voltage command is inputted to the inverter model to generate an actual voltage information. The voltage command includes a phase command information and an amplitude command information. The phase compensating step includes configuring a phase controller to receive the voltage command, and compute the phase command information of the voltage command and the actual voltage information to generate a compensating phase information according to a phase compensating program. The amplitude compensating step includes configuring an amplitude controller to receive the voltage command, and compute the amplitude command information of the voltage command and the actual voltage information to generate a compensating amplitude information according to an amplitude compensating program. The compensation information generating step includes configuring the processor to generate a compensating voltage command according to the compensating phase information and the compensating amplitude information. The compensating voltage command is inputted to the inverter model to generate a compensating actual voltage information. A difference between the compensating actual voltage information and the voltage command is less than a difference between the actual voltage information and the voltage command.

According to another aspect of the present disclosure, a phase and an amplitude improving system includes an inverter circuit, a processor, a phase controller and an amplitude controller. The processor is configured to establish an inverter model corresponding to the inverter circuit. A voltage command is inputted to the inverter model to generate an actual voltage information. The voltage command includes a phase command information and an amplitude command information. The phase controller is signally connected to the processor. The phase controller receives the voltage command, and computes the phase command information of the voltage command and the actual voltage information to generate a compensating phase information according to a phase compensating program. The amplitude controller is signally connected to the processor and the phase controller. The amplitude controller receives the voltage command, and computes the amplitude command information of the voltage command and the actual voltage information to generate a compensating amplitude information according to an amplitude compensating program. The processor generates a compensating voltage command according to the compensating phase information and the compensating amplitude information, and the compensating voltage command is inputted to the inverter model to generate a compensating actual voltage information. A difference between the compensating actual voltage information and the voltage command is less than a difference between the actual voltage information and the voltage command.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
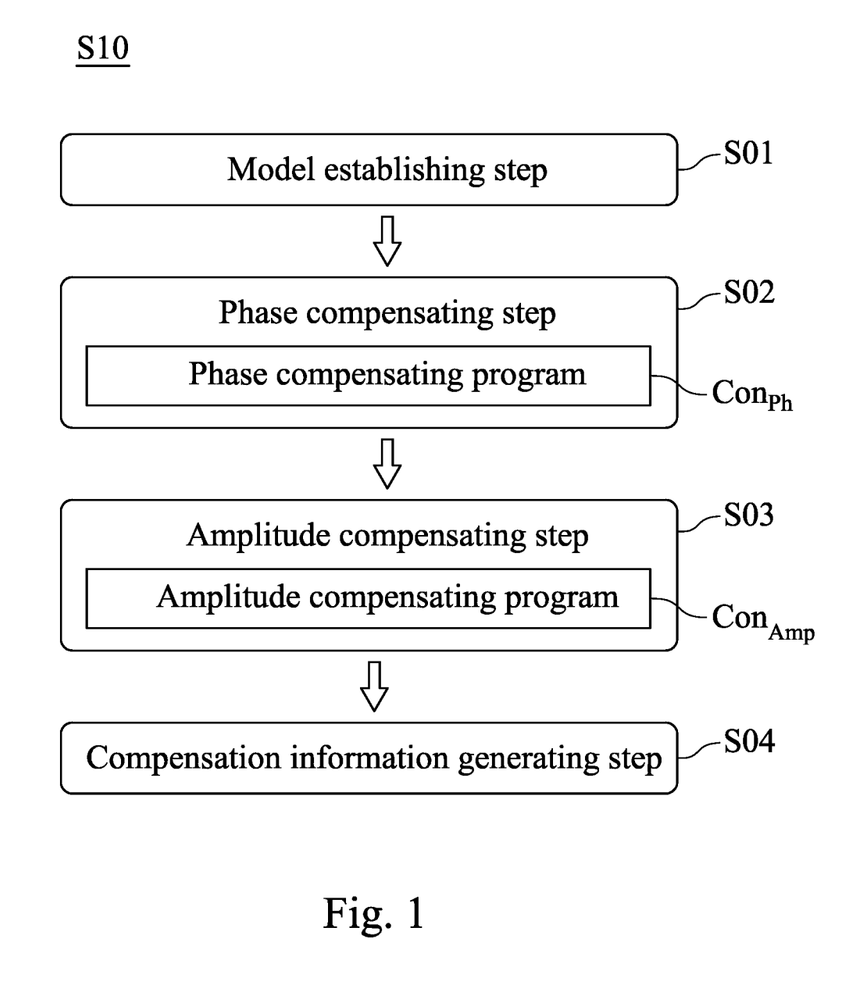
FIG. 1 shows a flow chart of a phase and an amplitude improving method according to a first embodiment of the present disclosure.
Figure 2:
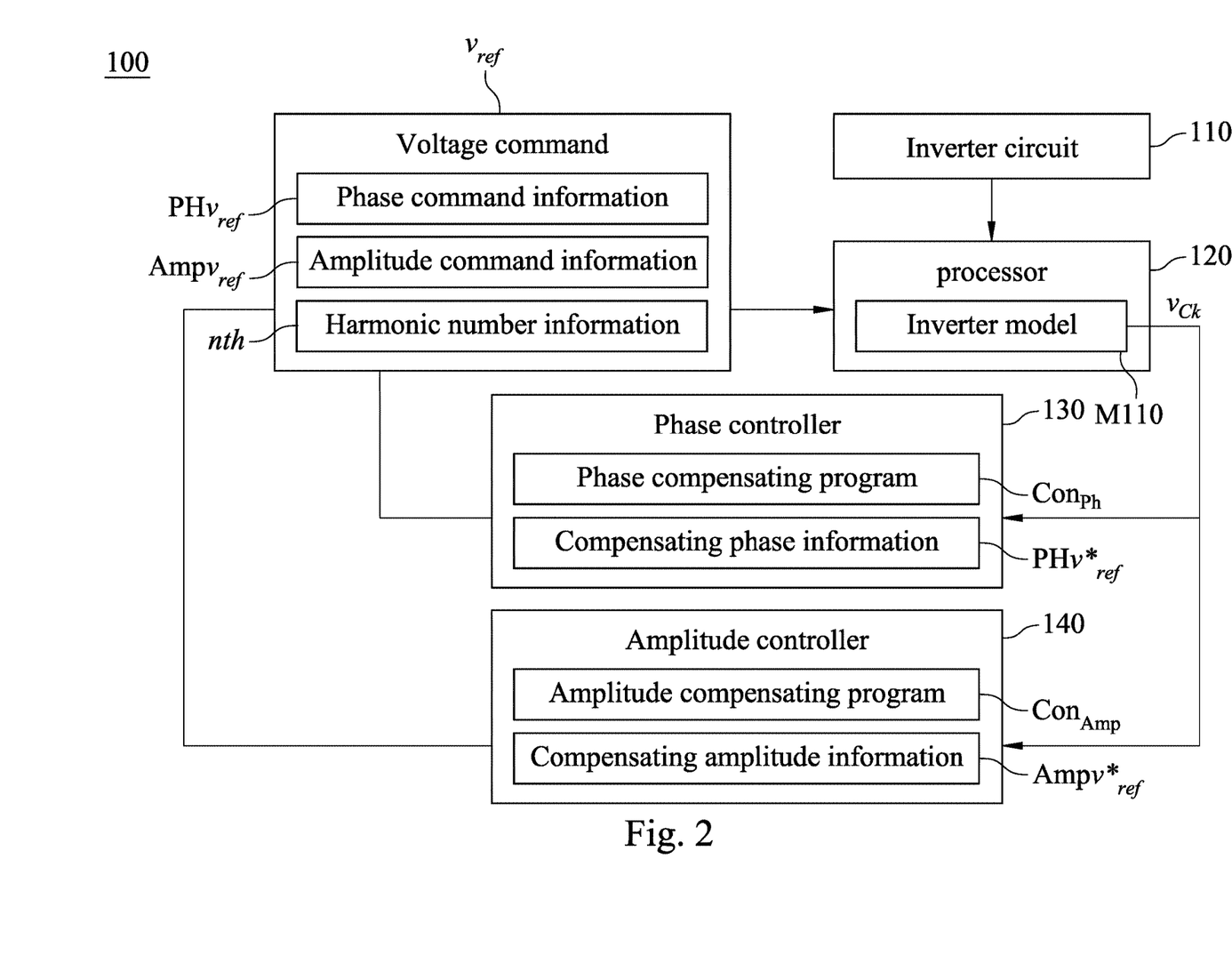
FIG. 2 shows a block diagram of a phase and an amplitude improving system according to a second embodiment of the present disclosure.
Figure 3:
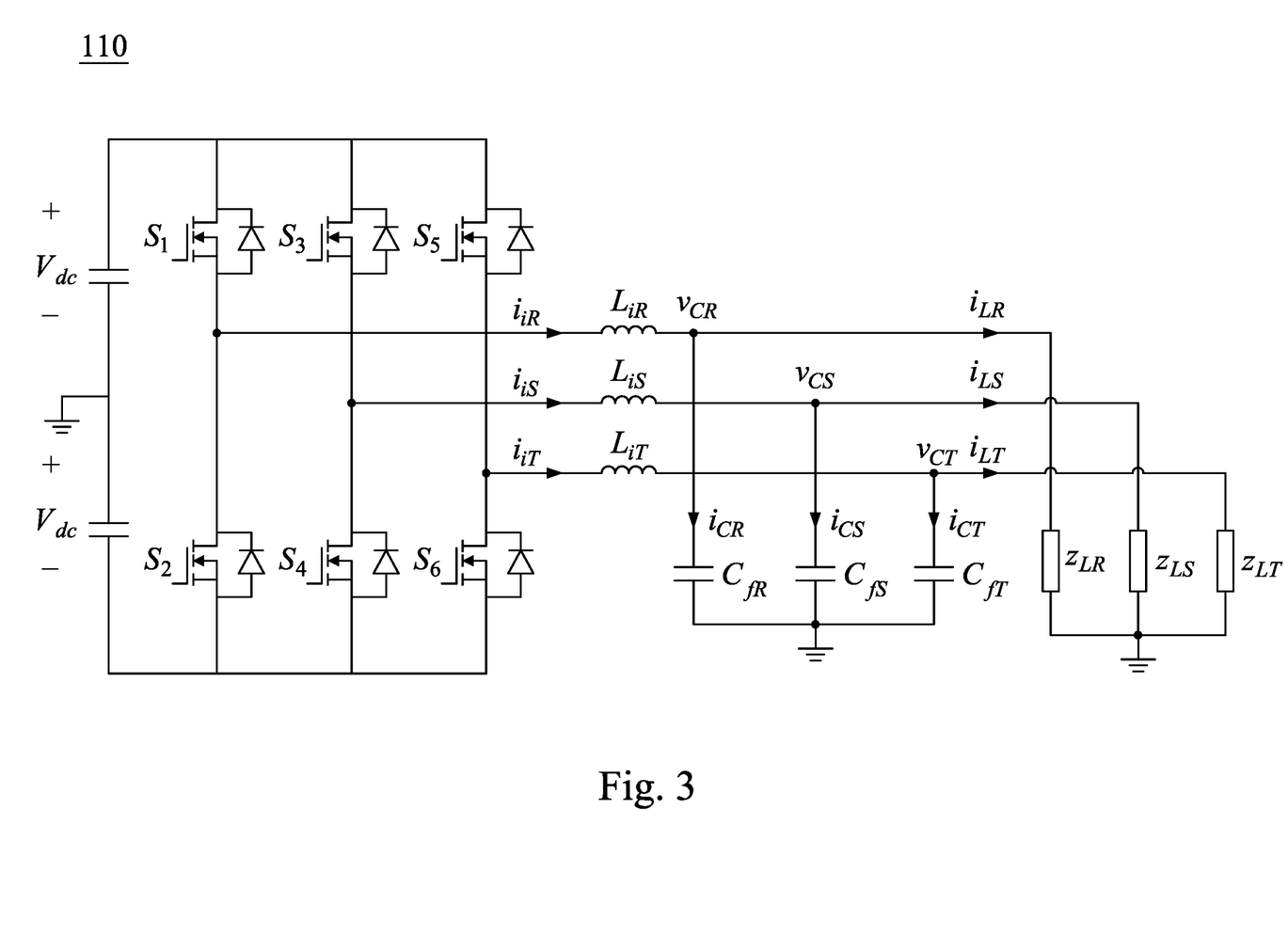
FIG. 3 shows a schematic view of an inverter circuit.
Figure 4:
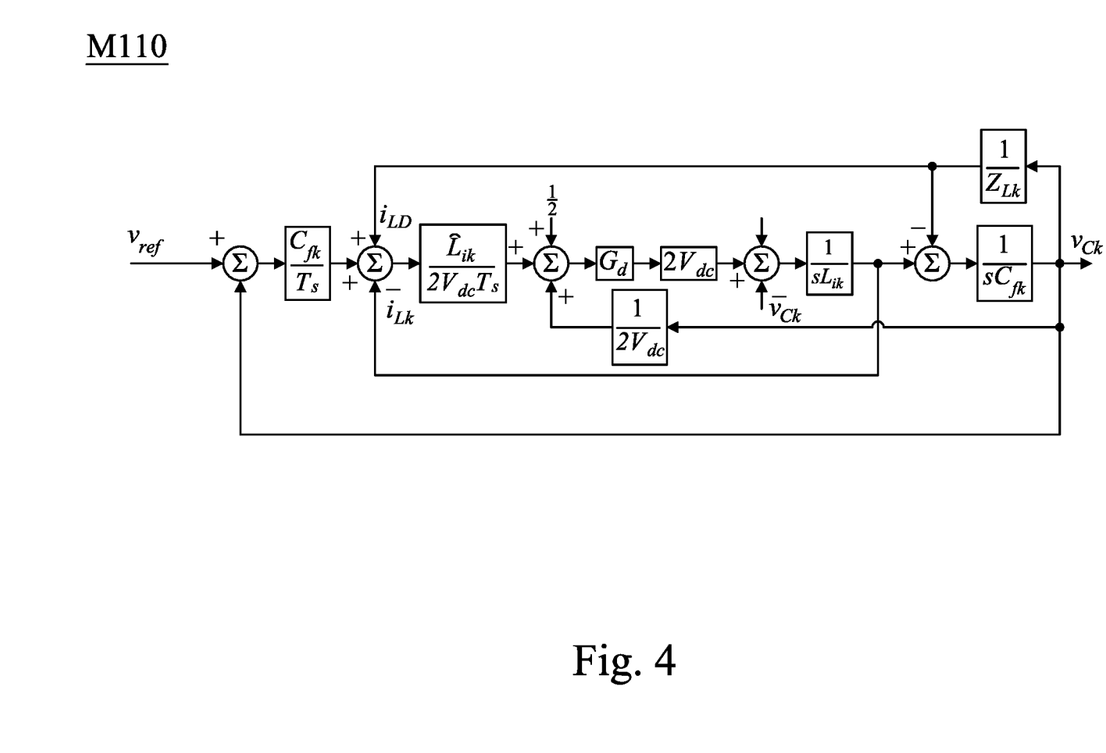
FIG. 4 shows an inverter model of the phase and the amplitude improving system of FIG. 2.
Figure 5:
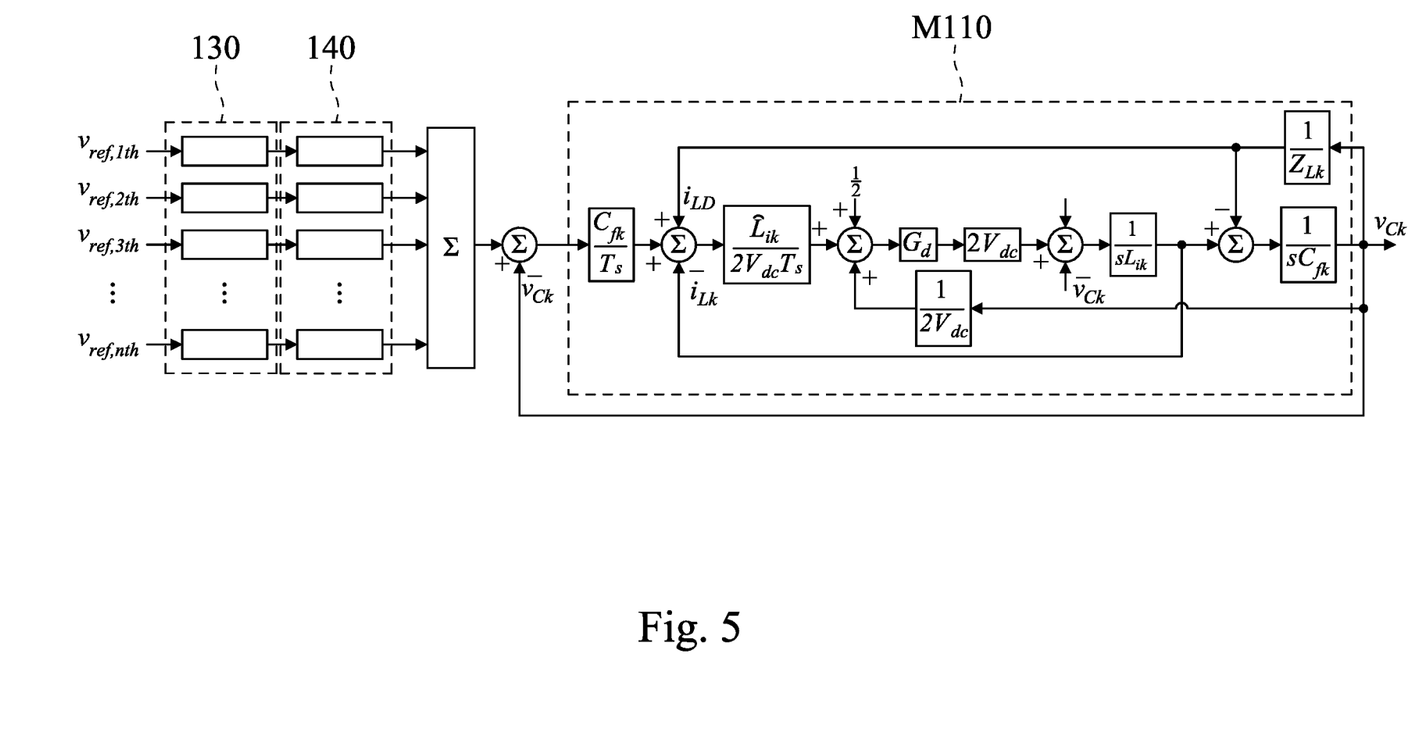
FIG. 5 shows a schematic view of the phase and the amplitude improving system of FIG. 2.
Figure 6:
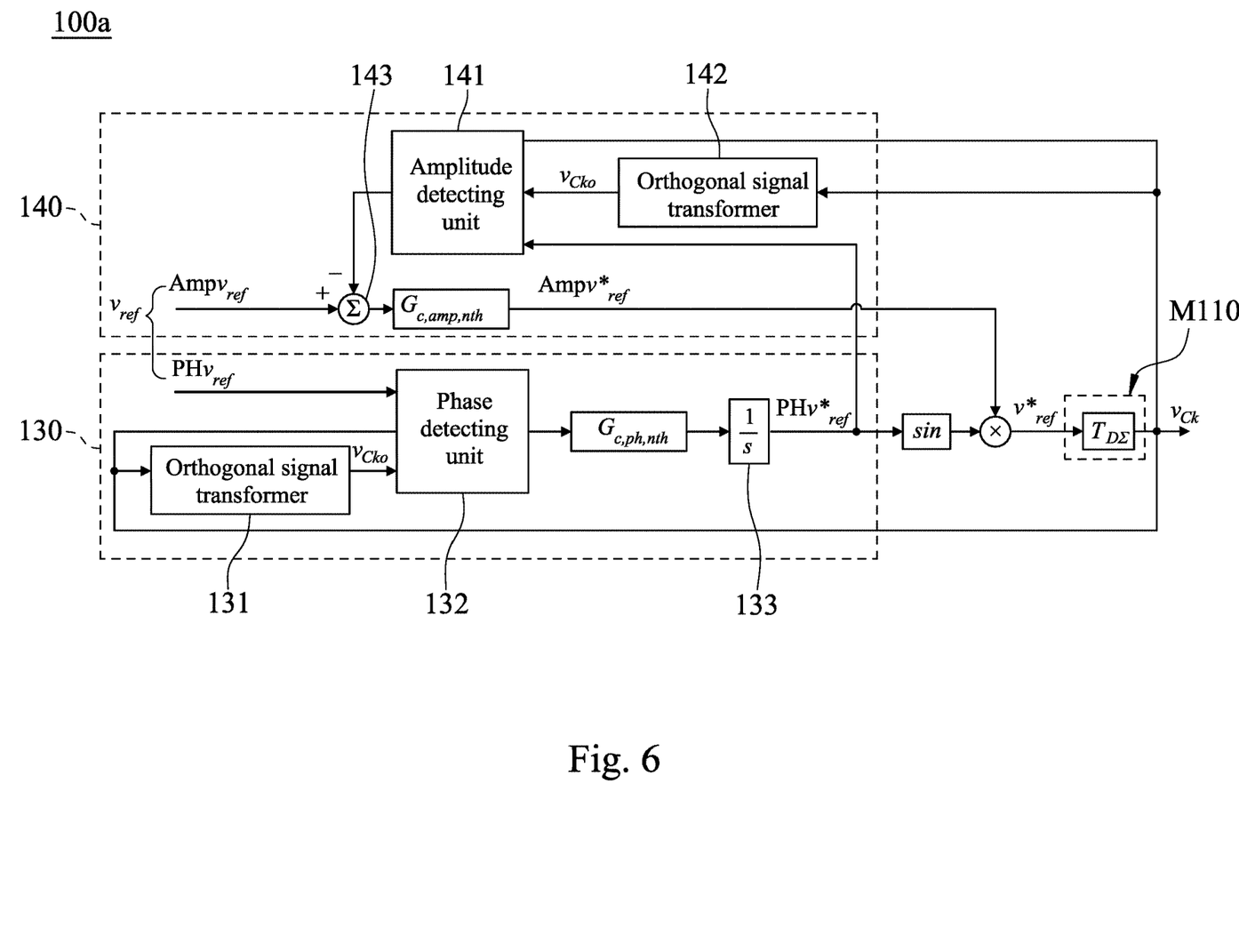
FIG. 6 shows a schematic view of a phase and an amplitude improving system according to a third embodiment of the present disclosure.

Please refer to FIGS. 1-6. FIG. 1 shows a flow chart of a phase and an amplitude improving method S10 according to a first embodiment of the present disclosure. FIG. 2 shows a block diagram of a phase and an amplitude improving system 100 according to a second embodiment of the present disclosure. FIG. 3 shows a schematic view of an inverter circuit 110. FIG. 4 shows an inverter model M110 of the phase and the amplitude improving system 100 of FIG. 2. FIG. 5 shows a schematic view of the phase and the amplitude improving system 100 of FIG. 2. FIG. 6 shows a schematic view of a phase and an amplitude improving system 100a according to a third embodiment of the present disclosure. The phase and the amplitude improving method S10 includes performing a model establishing step S01, a phase compensating step S02, an amplitude compensating step S03 and a compensation information generating step S04.

The model establishing step S01 includes configuring a processor 120 to establish the inverter model M110 corresponding to the inverter circuit 110. A voltage command $v_{ref}$ is inputted to the inverter model M110 to generate an actual voltage information $v_{Ck}$. The voltage command $v_{ref}$ includes a phase command information $PHv_{ref}$, an amplitude command information $Ampv_{ref}$ and a harmonic number information nth.

The phase compensating step S02 includes configuring a phase controller 130 to receive the voltage command $v_{ref}$, and compute the phase command information $PHv_{ref}$ of the voltage command $v_{ref}$ and the actual voltage information $v_{Ck}$ to generate a compensating phase information $PHv^*_{ref}$ according to a phase compensating program $Con_{Ph}$.

The amplitude compensating step S03 includes configuring an amplitude controller 140 to receive the voltage command $v_{ref}$, and compute the amplitude command information $Ampv_{ref}$ of the voltage command $v_{ref}$ and the actual voltage information $v_{Ck}$ to generate a compensating amplitude information $Ampv^*_{ref}$ according to an amplitude compensating program $Con_{Amp}$.

The compensation information generating step S04 includes configuring the processor 120 to generate a compensating voltage command $v^*_{ref}$ according to the compensating phase information $PHv^*_{ref}$ and the compensating amplitude information $Ampv^*_{ref}$. The compensating voltage command $v^*_{ref}$ is inputted to the inverter model M110 to generate a compensating actual voltage information $v^*_{Ck}$. A difference between the compensating actual voltage information $v^*_{Ck}$ and the voltage command $v_{ref}$ is less than a difference between the actual voltage information $v_{Ck}$ and the voltage command $v_{ref}$.

Thus, the phase and the amplitude improving method S10 of the present disclosure can let the actual output voltage of the inverter circuit 110 approach a value of the voltage command $v_{ref}$ by compensating the phase and the amplitude of the actual output voltage of the inverter circuit 110 via the phase compensating program $Con_{Ph}$ and the amplitude compensating program $Con_{Amp}$.

Please refer to FIG. 2 and FIG. 6. The phase and the amplitude improving system 100 includes an inverter circuit 110, a processor 120, a phase controller 130 and an amplitude controller 140. The processor 120 is configured to establish an inverter model M110 corresponding to the inverter circuit 110. A voltage command $v_{ref}$ is inputted to the inverter model M110 to generate an actual voltage information $v_{Ck}$. The voltage command $v_{ref}$ includes a phase command information $PHv_{ref}$, an amplitude command information $Ampv_{ref}$ and a harmonic number information nth. The phase controller 130 is signally connected to the processor 120. The phase controller 130 receives the voltage command $v_{ref}$, and computes the phase command information $PHv_{ref}$ of the voltage command $v_{ref}$ and the actual voltage information $v_{Ck}$ to generate a compensating phase information $PHv^*_{ref}$ according to a phase compensating program $Con_{Ph}$. The amplitude controller 140 is signally connected to the processor 120 and the phase controller 130. The amplitude controller 140 receives the voltage command $v_{ref}$, and computes the amplitude command information $Ampv_{ref}$ of the voltage command $v_{ref}$ and the actual voltage information $v_{Ck}$ to generate a compensating amplitude information $Ampv^*_{ref}$ according to an amplitude compensating program Con$_{Amp}$. The processor 120 generates a compensating voltage command v*$_{ref}$ according to the compensating phase information PHv*$_{ref}$ and the compensating amplitude information Ampv*$_{ref}$, and the compensating voltage command v*$_{ref}$ is inputted to the inverter model M110 to generate a compensating actual voltage information v*$_{Ck}$. A difference between the compensating actual voltage information v*$_{Ck}$ and the voltage command v$_{ref}$ is less than a difference between the actual voltage information v$_{Ck}$ and the voltage command v$_{ref}$.

Please refer to FIGS. 2-4. The structure of the inverter circuit 110 is shown in FIG. 3. The inverter circuit 110 can be a three-phase inverter circuit, and is configured to invert a DC voltage v$_{dc}$ into a three-phase AC voltage, and generate a plurality of load currents i$_{LR}$, i$_{LS}$, i$_{LT}$ to a plurality of loads z$_{LR}$, z$_{LS}$, z$_{LT}$. The inverter circuit 110 includes a plurality of switching components S$_1$, S$_2$, S$_3$, S$_4$, S$_5$, S$_6$, a plurality of inductors L$_{iR}$, L$_{iS}$, L$_{iT}$ and a plurality of capacitors C$_{fR}$, C$_{fS}$, C$_{fT}$. The switching components S$_1$, S$_2$, S$_3$, S$_4$, S$_5$, S$_6$ can be controlled by a pulse width modulation (PWM) signal to open and close. The currents i$_{CR}$, i$_{CS}$, i$_{CT}$ flow into the capacitors C$_{fR}$, C$_{fS}$, C$_{fT}$, respectively. The voltages on the capacitors C$_{fR}$, C$_{fS}$, C$_{fT}$ are the node voltages v$_{CR}$, v$_{CS}$, v$_{CT}$, respectively. The currents i$_{iR}$, i$_{iS}$, i$_{iT}$ flow into the inductors L$_{iR}$, L$_{iS}$, L$_{iT}$, respectively.

In detail, the processor 120 can divide the inverter circuit 110 into three phases, and derive the inverter model M110 shown in FIG. 4 according to the on/off state of the switching components S$_1$, S$_2$, S$_3$, S$_4$, S$_5$, S$_6$. The transfer function T(s) of the inverter model M110 is satisfied by formulas (1), (2) and (3):

$$T(s) = v_{Ck}(s)/v_{ref}(s) = A/B; \quad (1)$$

$$A = C_{fk} \cdot G_d \cdot L_{ik} \cdot k \cdot Z_{Lk}; \quad (2)$$

$$B = (C_{fk} \cdot L_{ik} \cdot k_L \cdot T_s^2 \cdot Z_{Lk}) \cdot s^2$$
$$= +(L_{ik} \cdot k_L \cdot T_s^2 + C_{fk} \cdot G_d \cdot L_{ik} \cdot k \cdot Z_{Lk} \cdot T_s) \cdot s$$
$$= +T_s^2 \cdot L_{Lk} - G_d \cdot T_s^2 \cdot Z_{Lk} + C_{fk} \cdot G_d \cdot L_{ik} \cdot k \cdot Z_{Lk}. \quad (3)$$

In FIG. 4, the voltage command v$_{ref}$ represents an input voltage of the inverter model M110. v$_{Ck}$ is the actual voltage information v$_{Ck}$ outputted by the inverter model M110. k corresponds to one of the three phases R, S, T. G$_d$ is the gain. The inductor L$_{ik}$ corresponds to one of the inductors L$_{iR}$, L$_{iS}$, L$_{iT}$. The capacitor C$_{fk}$ corresponds to one of the capacitors C$_{fR}$, C$_{fS}$, C$_{fT}$. The load z$_{Lk}$ corresponds to one of the loads z$_{LR}$, z$_{LS}$, z$_{LT}$. The load current i$_{LK}$ corresponds to the load currents i$_{LR}$, i$_{LS}$, i$_{LT}$ flow into the loads z$_{LR}$, z$_{LS}$, z$_{LT}$.

Please refer to FIG. 2, FIG. 4 and FIG. 5. In FIG. 5, the voltage commands v$_{ref,1th}$, v$_{ref,2th}$, v$_{ref,3th}$-v$_{ref,nth}$ correspond to 1th, 2th, 3th-nth harmonics. In order to reduce the difference between the actual voltage information v$_{Ck}$ and the voltage command v$_{ref}$, the phase controller 130 and the amplitude controller 140 generate the compensating phase information PHv*$_{ref}$ and the compensating amplitude information Ampv*$_{ref}$ according to the actual voltage information v$_{Ck}$ and the voltage command v$_{ref}$ to calculate the compensating voltage command v*$_{ref}$. The compensating actual voltage information v*$_{Ck}$ generated from the compensating voltage command v*$_{ref}$ is closer to the voltage command v$_{ref}$ than the actual voltage information v$_{Ck}$ to the voltage command v$_{ref}$. Thus, the phase and the amplitude improving system 100 of the present disclosure can reduce the difference between the actual output voltage of the inverter circuit 110 and the voltage command v$_{ref}$ by compensating the phase and the amplitude of the actual output voltage of the inverter circuit 110 via the phase controller 130 and the amplitude controller 140. The detail of the phase controller 130 and the amplitude controller 140 are described in more detail below.

Please refer to FIGS. 2 and 6. In FIG. 6, the phase and the amplitude improving system 100a includes an inverter circuit (not shown), a processor (not shown), a phase controller 130 and an amplitude controller 140. In the third embodiment, the inverter circuit and the processor of the phase and the amplitude improving system 100a are the same as the inverter circuit 110 and the processor 120 of the phase and the amplitude improving system 100 in the second embodiment, and will not be described again. Moreover, the phase controller 130 can include an orthogonal signal transformer 131, a phase detecting unit 132, a phase compensating gain G$_{c,ph,nth}$ and an integrator 133. The amplitude controller 140 can include an amplitude detecting unit 141, an orthogonal signal transformer 142, a subtraction operation 143 and an amplitude compensating gain G$_{c,amp,nth}$.

FIG. 6 shows a schematic view of an nth hamonic voltage command v$_{ref,nth}$ adjusted by the phase controller 130 and the amplitude controller 140. The AC representation formula of the voltage command v$_{ref,nth}$ is satisfied by a formula (4):

$$v_{ref,nth} = V^*_{amp,nth} \sin(n\omega_{fun} t + \theta^*_{nth}). \quad (4)$$

V*$_{amp,nth}$ represents the amplitude command information Ampv$_{ref}$ of the voltage command v$_{ref}$. θ*$_{nth}$ represents the phase command information PHv$_{ref}$. ω$_{fun}$t represents a base angular frequency of the inverter circuit 110.

The phase compensating program Con$_{Ph}$ can include configuring the phase controller 130 to perform an orthogonal operation on the actual voltage information v$_{Ck}$ to generate an actual voltage orthogonal information v$_{Cko}$ and configuring the phase controller 130 to receive the phase command information PHv$_{ref}$, the actual voltage information v$_{Ck}$ and the actual voltage orthogonal information v$_{Cko}$ to generate an angle difference, and perform a multiplication operation on the angle difference, a phase compensating gain G$_{c,ph,nth}$ and a value (1/s) of the integrator 133 to generate the compensating phase information PHv*$_{ref}$. In detail, the orthogonal signal transformer 131 of the phase controller 130 transforms the actual voltage information v$_{Ck}$ into the actual voltage orthogonal information v$_{Cko}$, and the phase detecting unit 132 of the phase controller 130 receives the phase command information PHv$_{ref}$, the actual voltage information v$_{Ck}$, and the actual voltage orthogonal information v$_{Cko}$ to generate an output signal. The output signal is an angle difference between the phase command information PHv$_{ref}$ and the actual voltage information v$_{Ck}$. The multiplication operation is performed on the value of the integrator 133 of the phase controller 130, the angle difference and the phase compensating gain G$_{c,ph,nth}$ to generate the compensating phase information PHv*$_{ref}$.

The compensating phase information PHv*$_{ref}$ is satisfied by a formula (5):

$$v_{ph,nth} = \{\sin(n\omega_{fun} t)[V_{fb,amp,nth}\cos(n\omega_{fun} t + \Delta\theta_{fb,nth})] - \quad (5)$$
$$\cos(n\omega_{fun} t)[V_{fb,amp,nth}\sin(n\omega_{fun} t + \Delta\theta_{fb,nth})]\}.$$

wherein $v_{ph,nth}$ represents the compensating phase information $PHv^*_{ref}$, $\sin(n\omega_{fun}t)$ represents the phase command information $PHv_{ref}$, $\cos(n\omega_{fun}t)$ represents a phase command orthogonal information $PHv_{refo}$, $v_{fb,amp,nth}$ $\sin(n\omega_{fun}t+\Delta\theta_{fb,nth})$ represents the actual voltage information $v_{Ck}$, $v_{fb,amp,nth}$ $\cos(n\omega_{fun}t+\Delta\theta_{fb,nth})$ represents the actual voltage orthogonal information $v_{Cko}$, $\Delta\theta_{fb,nth}$ represents the angle difference between an actual phase information of the actual voltage information and the phase command information $PHv_{ref}$.

The amplitude compensating program $Con_{Amp}$ can include configuring the amplitude controller 140 to receive the amplitude command information $Ampv_{ref}$, the actual voltage information $v_{Ck}$, the actual voltage orthogonal information $v_{Cko}$ and the compensating phase information $PHv^*_{ref}$ to perform a subtraction operation 143 to generate an output result and configuring the amplitude controller 140 to perform another multiplication operation on the output result and the amplitude compensating gain $G_{c,amp,nth}$ to generate the compensating amplitude information $Ampv^*_{ref}$.

The compensating amplitude information $Ampv^*_{ref}$ is satisfied by a formula (6):

$$v_{fb,amp,nth} = \{\cos(\hat{\theta}_{nth})[V_{fb,amp,nth}\cos(n\omega_{fun}t+\Delta\theta_{fb,nth})] + \sin(\hat{\theta}_{nth})[V_{fb,amp,nth}\sin(n\omega_{fun}t+\Delta\theta_{fb,nth})]\}. \quad (6)$$

wherein $v_{fb,amp,nth}$ represents the compensating amplitude information $Ampv^*_{ref}$, $\sin(\hat{\theta}_{nth})$ represents the compensating phase information $PHv^*_{ref}$, $\cos(\hat{\theta}_{nth})$ represents a compensating phase orthogonal information $PHv^*_{refo}$, $v_{fb,amp,nth}$ $\sin(n\omega_{fun}t+\Delta\theta_{fb,nth})$ represents the actual voltage information $v_{Ck}$, $v_{fb,amp,nth}$ $\cos(n\omega_{fun}t+\Delta\theta_{fb,nth})$ represents the actual voltage orthogonal information $v_{Cko}$, $\Delta\theta_{fb,nth}$ represents the angle difference between the actual phase information of the actual voltage information and the phase command information $PHv_{ref}$.

The processor 120 calculates an AC representation formula of the compensating voltage command $v^*_{ref}$ according to the compensating phase information $PHv^*_{ref}$ and the compensating amplitude information $Ampv^*_{ref}$. The AC representation formula of the compensating voltage command $v^*_{ref}$ is satisfied by a formula (7):

$$v^*_{ref,nth} = v'_{amp,nth}\sin(n\omega_{fun}t + \hat{\theta}_{nth}). \quad (7)$$

$v^*_{ref,nth}$ represents the compensating voltage command $v^*_{ref}$, $v'_{amp,nth}$ represents the compensating amplitude information $Ampv^*_{ref}$, $\hat{\theta}_{nth}$ represents the compensating phase information $PHv^*_{ref}$.

Please refer to FIG. 6. The phase controller 130 and the amplitude controller 140 receive the phase command information $PHv_{ref}$ and the amplitude command information $Ampv_{ref}$ of the voltage command $v_{ref}$ respectively, to calculate the compensating phase information $PHv^*_{ref}$ and the compensating amplitude information $Ampv^*_{ref}$. Next, the compensating phase information $PHv^*_{ref}$ and the compensating amplitude information $Ampv^*_{ref}$ are transformed into the compensating voltage command $v^*_{ref}$. The compensating voltage command $v^*_{ref}$ is inputted into the inverter model M110 to generate the compensating actual voltage information $v^*_{Ck}$. After the above improvement and compensation, the compensating actual voltage information $v^*_{Ck}$ generated by the phase and the amplitude improving system 100*a* is closer to the voltage command $v_{ref}$ than the actual voltage information $v_{Ck}$ to the voltage command $v_{ref}$.

Figure 7A:
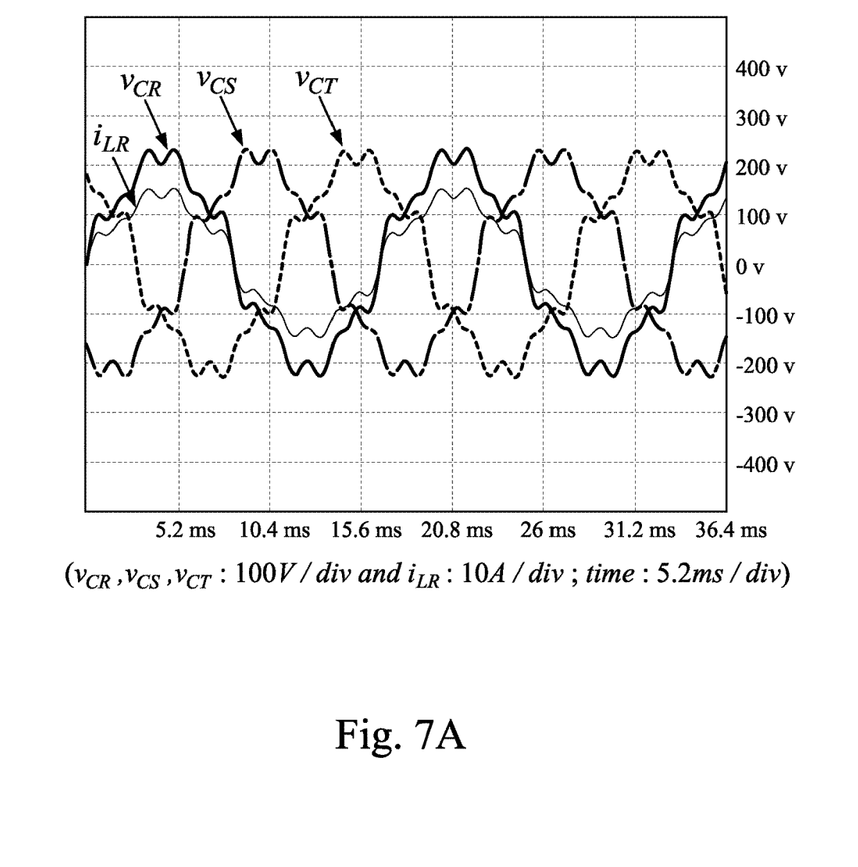
FIG. 7A shows a waveform diagram of an actual voltage information of the phase and the amplitude improving system of FIG. 6, when the phase and the amplitude improving system is applied to a resistive load.
Figure 7B:
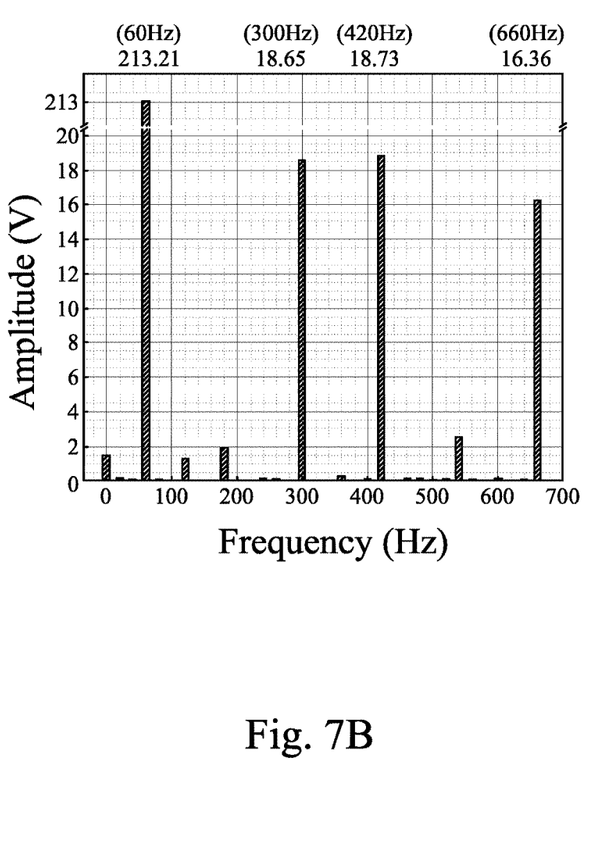
FIG. 7B shows an amplitude of the actual voltage information of the phase and the amplitude improving system of FIG. 6, when the phase and the amplitude improving system is applied to a resistive load.
Figure 7C:
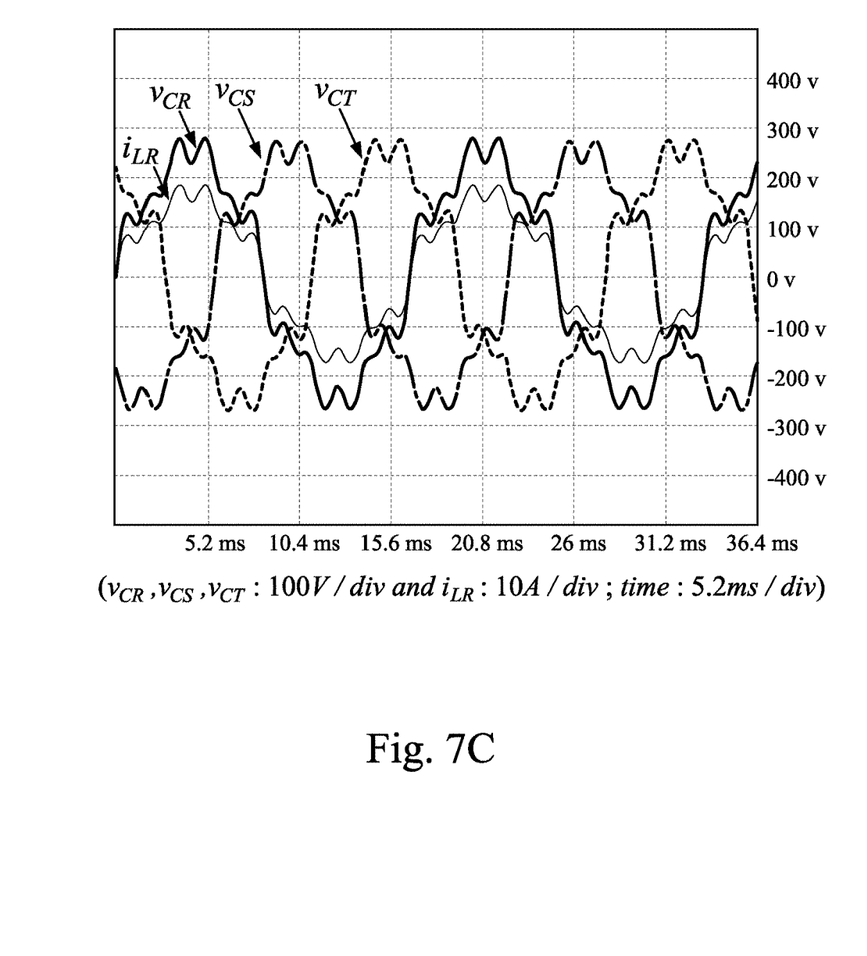
FIG. 7C shows a waveform diagram of a compensating actual voltage information of the phase and the amplitude improving system of FIG. 6, when the phase and the amplitude improving system is applied to a resistive load.
Figure 7D:
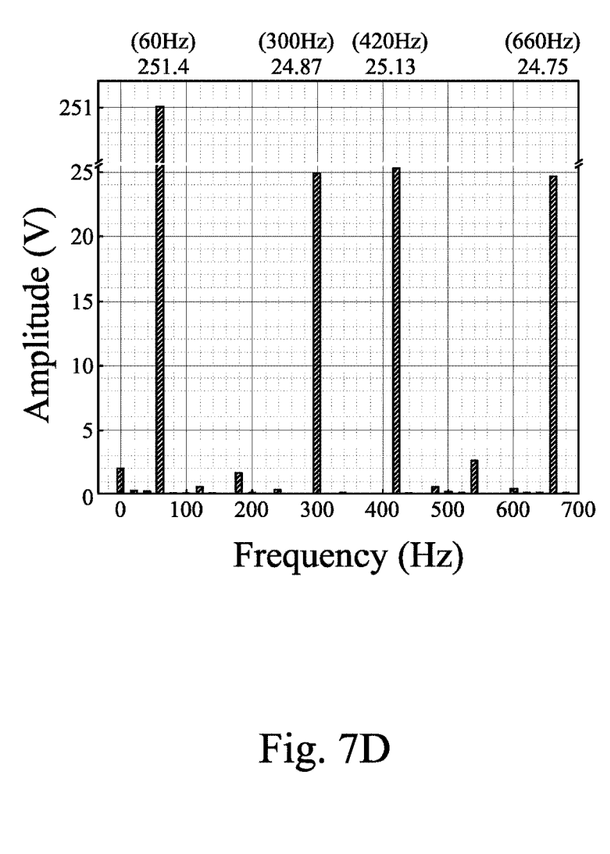
FIG. 7D shows an amplitude of the compensating actual voltage information of the phase and the amplitude improving system of FIG. 6, when the phase and the amplitude improving system is applied to a resistive load.
Figure 8A:
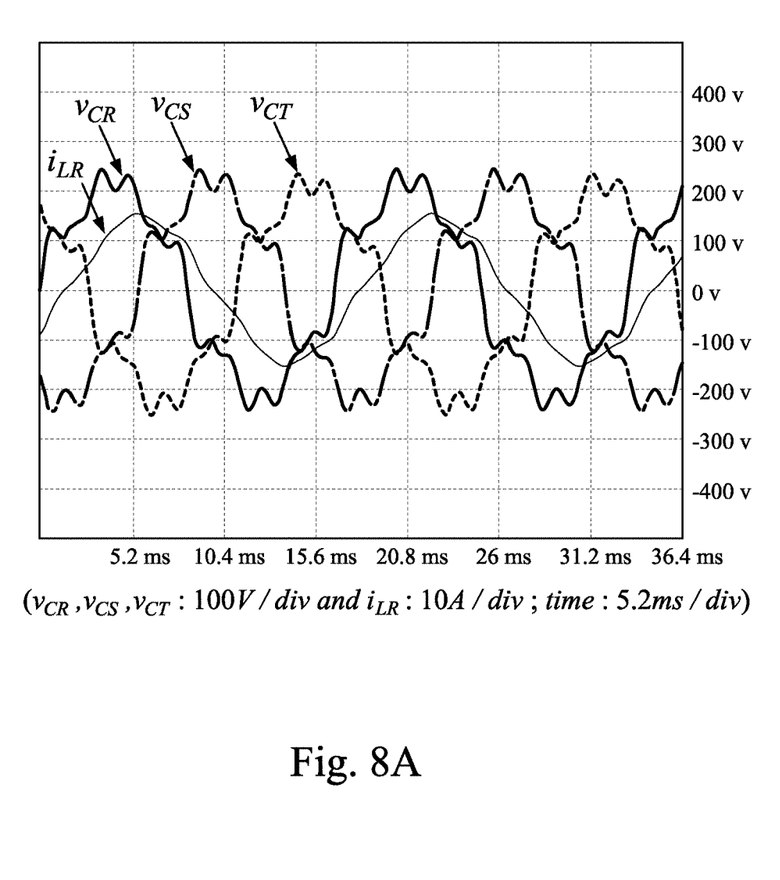
FIG. 8A shows a waveform diagram of an actual voltage information of the phase and the amplitude improving system of FIG. 6, when the phase and the amplitude improving system is applied to an inductive load.
Figure 8B:
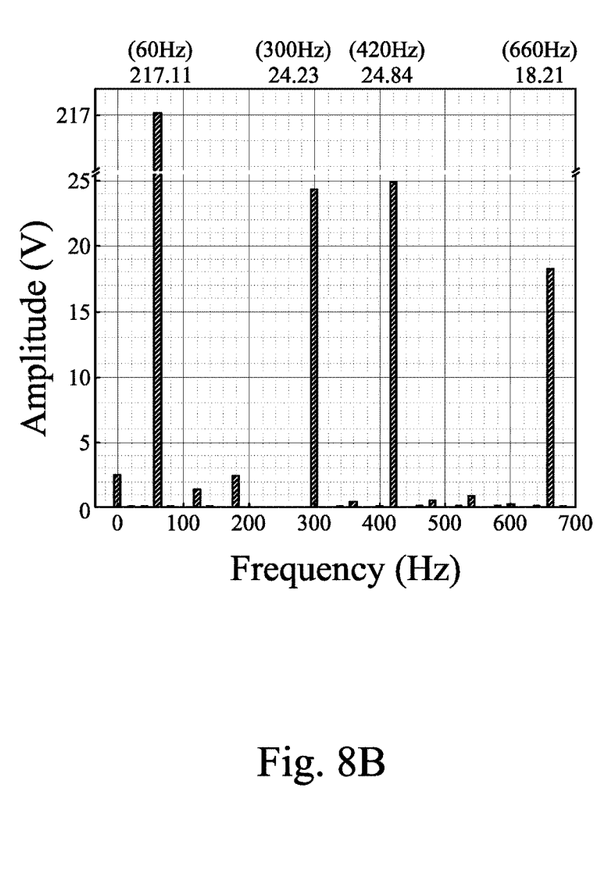
FIG. 8B shows an amplitude of the actual voltage information of the phase and the amplitude improving system of FIG. 6, when the phase and the amplitude improving system is applied to an inductive load.
Figure 8C:
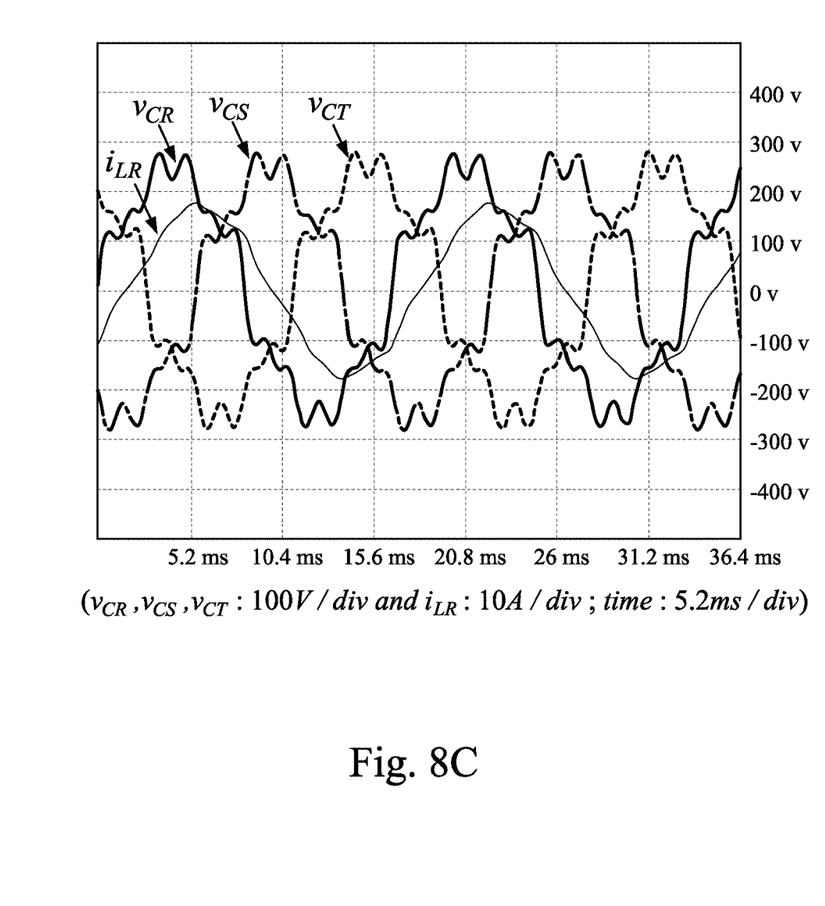
FIG. 8C shows a waveform diagram of a compensating actual voltage information of the phase and the amplitude improving system of FIG. 6, when the phase and the amplitude improving system is applied to an inductive load.
Figure 8D:
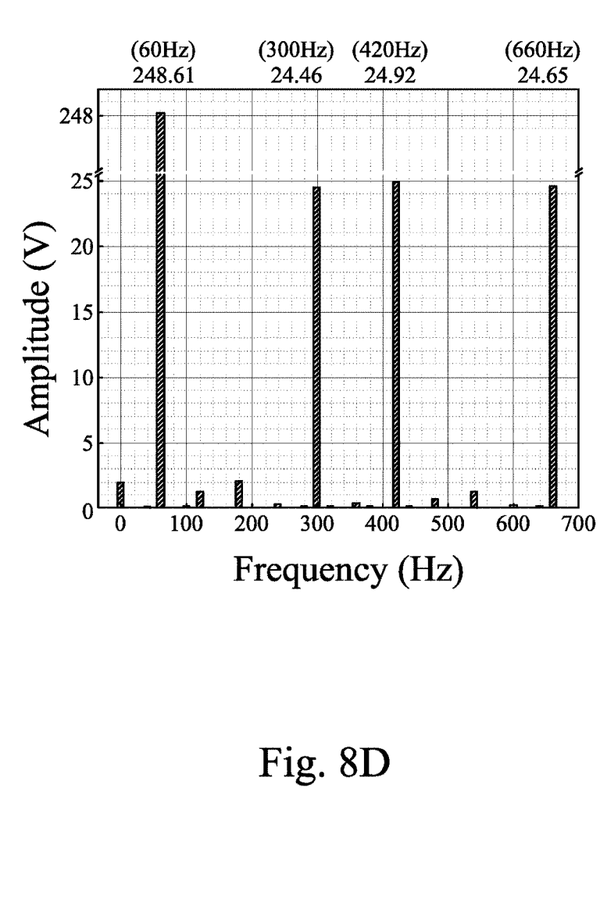
FIG. 8D shows an amplitude of the compensating actual voltage information of the phase and the amplitude improving system of FIG. 6, when the phase and the amplitude improving system is applied to an inductive load.
Figure 9A:
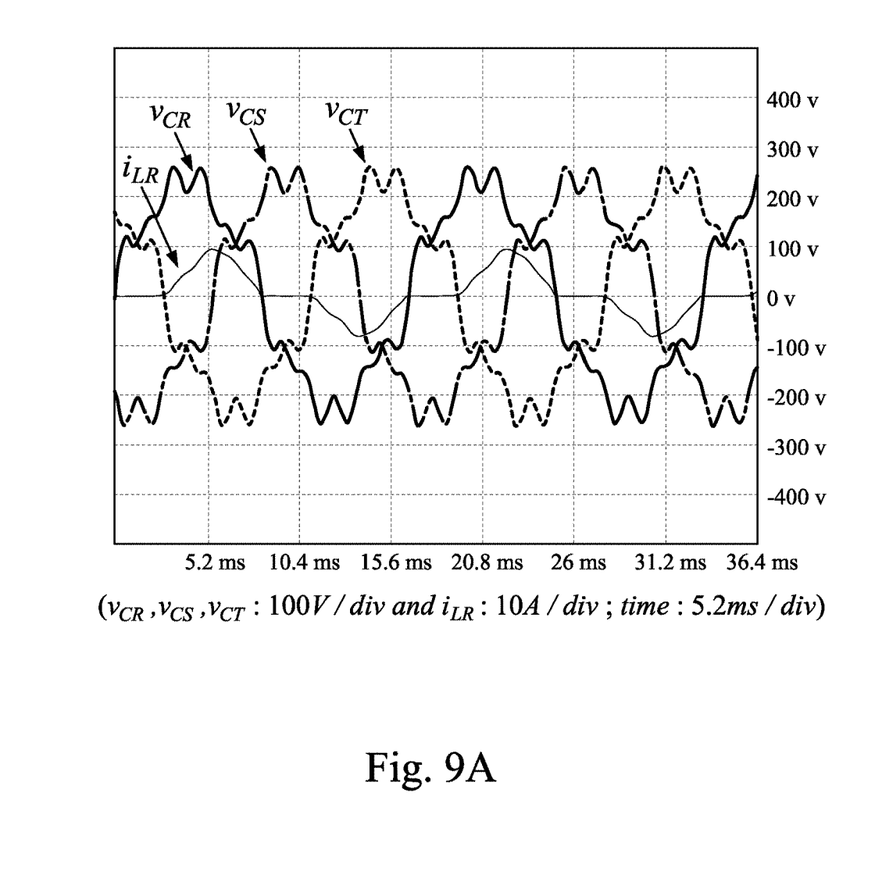
FIG. 9A shows a wave form diagram of an actual voltage information of the phase and the amplitude improving system of FIG. 6, when the phase and the amplitude improving system is applied to a capacitive load.
Figure 9B:
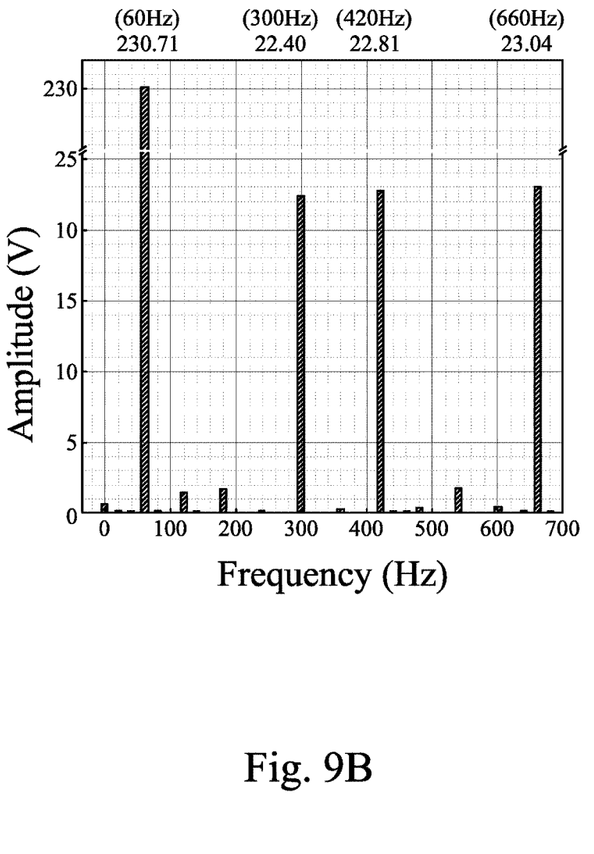
FIG. 9B shows an amplitude of the actual voltage information of the phase and the amplitude improving system of FIG. 6, when the phase and the amplitude improving system is applied to a capacitive load.
Figure 9C:
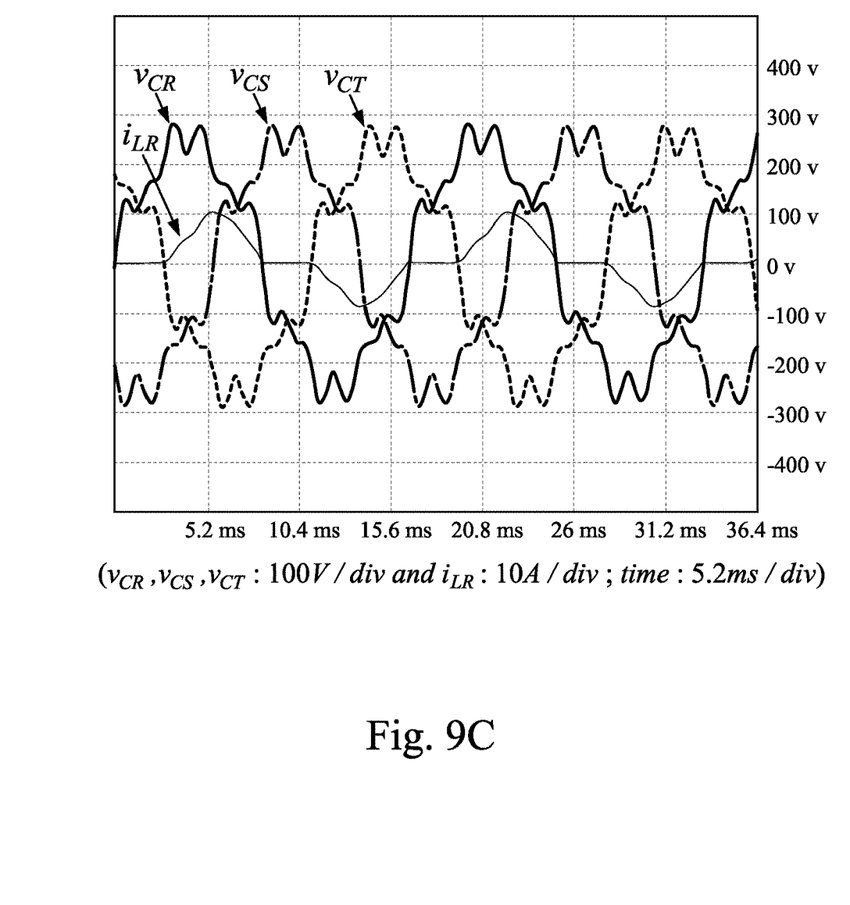
FIG. 9C shows a waveform diagram of a compensating actual voltage information of the phase and the amplitude improving system of FIG. 6, when the phase and the amplitude improving system is applied to a capacitive load.
Figure 9D:
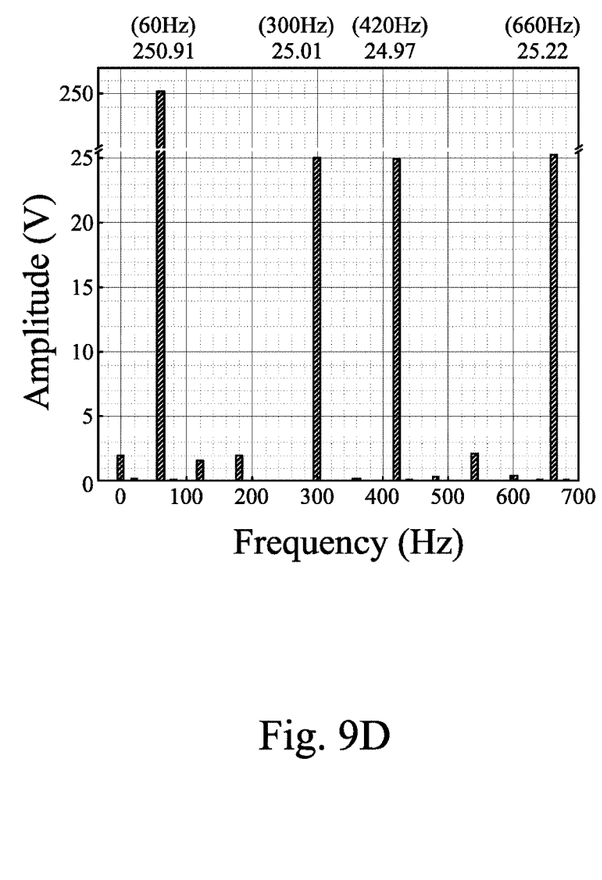
FIG. 9D shows an amplitude of the compensating actual voltage information of the phase and the amplitude improving system of FIG. 6, when the phase and the amplitude improving system is applied to a capacitive load.

Please refer to the FIG. 3, FIG. 7A, FIG. 7B, FIG. 7C, FIG. 7D, FIG. 8A, FIG. 8B, FIG. 8C, FIG. 8D, FIG. 9A, FIG. 9B, FIG. 9C and FIG. 9D. FIG. 7A shows a waveform diagram of an actual voltage information $v_{Ck}$ of the phase and the amplitude improving system 100*a* of FIG. 6, when the phase and the amplitude improving system 100*a* is applied to a resistive load. FIG. 7B shows an amplitude of the actual voltage information $v_{Ck}$ of the phase and the amplitude improving system 100*a* of FIG. 6, when the phase and the amplitude improving system 100*a* is applied to a resistive load. FIG. 7C shows a waveform diagram of a compensating actual voltage information $v^*_{Ck}$ of the phase and the amplitude improving system 100*a* of FIG. 6, when the phase and the amplitude improving system 100*a* is applied to a resistive load. FIG. 7D shows an amplitude of the compensating actual voltage information $v^*_{Ck}$ of the phase and the amplitude improving system 100*a* of FIG. 6, when the phase and the amplitude improving system 100*a* is applied to a resistive load. FIG. 8A shows a waveform diagram of an actual voltage information $v_{Ck}$ of the phase and the amplitude improving system 100*a* of FIG. 6, when the phase and the amplitude improving system 100*a* is applied to an inductive load. FIG. 8B shows an amplitude of the actual voltage information $v_{Ck}$ of the phase and the amplitude improving system 100*a* of FIG. 6, when the phase and the amplitude improving system 100*a* is applied to an inductive load. FIG. 8C shows a waveform diagram of a compensating actual voltage information $v^*_{Ck}$ of the phase and the amplitude improving system 100*a* of FIG. 6, when the phase and the amplitude improving system 100*a* is applied to an inductive load. FIG. 8D shows an amplitude of the compensating actual voltage information $v^*_{Ck}$ of the phase and the amplitude improving system 100*a* of FIG. 6, when the phase and the amplitude improving system 100*a* is applied to an inductive load. FIG. 9A shows a wave form diagram of an actual voltage information $v_{Ck}$ of the phase and the amplitude improving system 100*a* of FIG. 6, when the phase and the amplitude improving system 100*a* is applied to a capacitive load. FIG. 9B shows an amplitude of the actual voltage information $v_{Ck}$ of the phase and the amplitude improving system 100*a* of FIG. 6, when the phase and the amplitude improving system 100*a* is applied to a capacitive load. FIG. 9C shows a waveform diagram of a compensating actual voltage information $v^*_{Ck}$ of the phase and the amplitude improving system 100*a* of FIG. 6, when the phase and the amplitude improving system 100*a* is applied to a capacitive load. FIG. 9D shows an amplitude of the compensating actual voltage information $v^*_{Ck}$ of the phase and the amplitude improving system 100*a* of FIG. 6, when the phase and the amplitude improving system 100*a* is applied to a capacitive load. In other words, the measurements of the loads $z_{LR}$, $z_{LS}$, $z_{LT}$ are shown in FIG. 7A to FIG. 9D when the loads $z_{LR}$, $z_{LS}$, $z_{LT}$ are resistive loads, inductive loads and capacitive loads, and the voltage command $v_{ref}$ is 250 volts. In FIG. 7A, FIG. 8A and FIG. 9A, the waveform shows the load current $i_{LR}$ and the node voltages $v_{CR}$, $v_{CS}$, $v_{CT}$. In FIG. 7B, FIG. 8B and FIG. 9B, the bar chart shows the amplitude of the actual voltage information $v_{Ck}$ of the fundamental wave, the 5th harmonic wave, the 7th harmonic wave and the 11th harmonic wave. In FIG. 7C, FIG. 8C and FIG. 9C, the waveform shows the load current $i_{LR}$ and the node voltages $v_{CR}$, $v_{CS}$, $v_{CT}$. In FIG. 7D, FIG. 8D and FIG. 9D, the bar chart shows the amplitude of the compensating actual voltage information $v^*_{Ck}$ of the fundamental wave, the 5th harmonic wave, the 7th harmonic wave and the 11th harmonic wave. When the loads $z_{LR}$, $z_{LS}$, $z_{LT}$ are resistive loads, the actual voltage information $v_{Ck}$ and the compensating actual voltage information $v^*_{Ck}$ can be listed in Table 1. When the loads $z_{LR}$, $z_{LS}$, $z_{LT}$ are inductive loads, the actual voltage information $v_{Ck}$ and the compensating actual voltage information $v^*_{Ck}$ can be listed in Table 2. When the loads $z_{LR}$, $z_{LS}$, $z_{LT}$ are capacitive loads, the actual voltage information $v_{Ck}$ and the compensating actual voltage information $v^*_{Ck}$ can be listed in Table 3.

TABLE 1

| | Frequency (Hz) | Actual voltage information $v_{Ck}(V)$ | Compensating actual voltage information $v^*_{Ck}(V)$ |
|---|---|---|---|
| Fundamental wave | 60 | 213.21 | 251.4 |
| 5th harmonic wave | 300 | 18.65 | 24.87 |
| 7th harmonic wave | 420 | 18.73 | 25.13 |
| 11th harmonic wave | 660 | 16.36 | 24.75 |

TABLE 2

| | Frequency (Hz) | Actual voltage information $v_{Ck}(V)$ | Compensating actual voltage information $v^*_{Ck}(V)$ |
|---|---|---|---|
| Fundamental wave | 60 | 217.11 | 248.61 |
| 5th harmonic wave | 300 | 24.23 | 24.46 |
| 7th harmonic wave | 420 | 24.84 | 24.92 |
| 11th harmonic wave | 660 | 18.23 | 24.65 |

TABLE 3

| | Frequency (Hz) | Actual voltage information $v_{Ck}(V)$ | Compensating actual voltage information $v^*_{Ck}(V)$ |
|---|---|---|---|
| Fundamental wave | 60 | 230.71 | 250.91 |
| 5th harmonic wave | 300 | 22.40 | 25.01 |
| 7th harmonic wave | 420 | 22.81 | 24.97 |
| 11th harmonic wave | 660 | 23.04 | 25.22 |

Thus, the phase and the amplitude improving system 100a of the present disclosure can compensate to different harmonic of the voltage commands $v_{ref,fth}$-$v_{ref,nth}$, and let the compensating actual voltage information $v^*_{Ck}$ approach the voltage command $v_{ref}$.

According to the aforementioned embodiments and examples, the advantages of the present disclosure are described as follows.

1. The phase and the amplitude improving method of the present disclosure can let the actual output voltage of the inverter circuit approach a value of the voltage command by compensating the phase and the amplitude of the actual output voltage of the inverter circuit via the phase compensating program and the amplitude compensating program.

2. The phase and the amplitude improving system of the present disclosure can reduce the difference between the actual output voltage of the inverter circuit and the voltage command by compensating the phase and the amplitude of the actual output voltage of the inverter circuit via the phase controller and the amplitude controller.

3. The phase and the amplitude improving system of the present disclosure can compensate to different harmonic of the voltage commands, and let the compensating actual voltage information approach the voltage command.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A phase and an amplitude improving method, comprising:
    performing a model establishing step, wherein the model establishing step comprises configuring a processor to establish an inverter model corresponding to an inverter circuit, a voltage command is inputted to the inverter model to generate an actual voltage information, and the voltage command comprises a phase command information and an amplitude command information;
    performing a phase compensating step, wherein the phase compensating step comprises configuring a phase controller to receive the voltage command, and compute the phase command information of the voltage command and the actual voltage information to generate a compensating phase information according to a phase compensating program;
    performing an amplitude compensating step, wherein the amplitude compensating step comprises configuring an amplitude controller to receive the voltage command, and compute the amplitude command information of the voltage command and the actual voltage information to generate a compensating amplitude information according to an amplitude compensating program; and
    performing a compensation information generating step, wherein the compensation information generating step comprises configuring the processor to generate a compensating voltage command according to the compensating phase information and the compensating amplitude information, and the compensating voltage command is inputted to the inverter model to generate a compensating actual voltage information;
    wherein a difference between the compensating actual voltage information and the voltage command is less than a difference between the actual voltage information and the voltage command.

2. The phase and the amplitude improving method of claim 1, wherein the phase compensating program comprises:
    configuring the phase controller to perform an orthogonal operation on the actual voltage information to generate an actual voltage orthogonal information; and
    configuring the phase controller to receive the phase command information, the actual voltage information and the actual voltage orthogonal information to generate an angle difference, and perform a multiplication operation on the angle difference, a phase compensating gain and an integrator to generate the compensating phase information.

3. The phase and the amplitude improving method of claim 2, wherein the compensating phase information is satisfied the following condition:

$$v_{ph,nth} = \{\sin(n\omega_{fun}t)[V_{fb,amp,nth}\cos(n\omega_{fun}t + \Delta\theta_{fb,nth})] - \cos(n\omega_{fun}t)[V_{fb,amp,nth}\sin(n\omega_{fun}t + \Delta\theta_{fb,nth})]\};$$

wherein $v_{ph,nth}$ represents the compensating phase information, $\sin(n\omega_{fun}t)$ represents the phase command information, $\cos(n\omega_{fun}t)$ represents a phase command orthogonal information, $V_{fb,amp,nth} \sin(n\omega_{fun}t+\Delta\theta_{fb,nth})$ represents the actual voltage information, $V_{fb,amp,nth} \cos(n\omega_{fun}t+\Delta\theta_{fb,nth})$ represents the actual voltage orthogonal information, $\Delta\theta_{fb,nth}$ represents an angle difference between an actual phase information of the actual voltage information and the phase command information.

4. The phase and the amplitude improving method of claim 2, wherein the amplitude compensating program comprises:
   configuring the amplitude controller to receive the amplitude command information, the actual voltage information, the actual voltage orthogonal information and the compensating phase information to perform a subtraction operation to generate an output result; and
   configuring the amplitude controller to perform another multiplication operation on the output result and an amplitude compensating gain to generate the compensating amplitude information.

5. The phase and the amplitude improving method of claim 4, wherein the compensating amplitude information is satisfied the following condition:

$$v_{fb,amp,nth} = \{\cos(\hat{\theta}_{nth})[V_{fb,amp,nth}\cos(n\omega_{fun}t + \Delta\theta_{fb,nth})] + \sin(\hat{\theta}_{nth})[V_{fb,amp,nth}\sin(n\omega_{fun}t + \Delta\theta_{fb,nth})]\};$$

wherein $v_{fb,amp,nth}$ represents the compensating amplitude information, $\sin(\hat{\theta}_{nth})$ represents the compensating phase information, $\cos(\hat{\theta}_{nth})$ information, represents a compensating phase orthogonal $V_{fb,amp,nth} \sin(n\omega_{fun}t+\Delta\theta_{fb,nth})$ represents the actual voltage information, $V_{fb,amp,nth} \cos(n\omega_{fun}t+\Delta\theta_{fb,nth})$ represents the actual voltage orthogonal information, $\Delta\theta_{fb,nth}$ represents an angle difference between an actual phase information of the actual voltage information and the phase command information.

6. A phase and an amplitude improving system, comprising:
   an inverter circuit;
   a processor configured to establish an inverter model corresponding to the inverter circuit, wherein a voltage command is inputted to the inverter model to generate an actual voltage information, and the voltage command comprises a phase command information and an amplitude command information;
   a phase controller signally connected to the processor, wherein the phase controller receives the voltage command, and computes the phase command information of the voltage command and the actual voltage information to generate a compensating phase information according to a phase compensating program; and
   an amplitude controller signally connected to the processor and the phase controller, wherein the amplitude controller receives the voltage command, and computes the amplitude command information of the voltage command and the actual voltage information to generate a compensating amplitude information according to an amplitude compensating program;
   wherein the processor generates a compensating voltage command according to the compensating phase information and the compensating amplitude information, and the compensating voltage command is inputted to the inverter model to generate a compensating actual voltage information;
   wherein a difference between the compensating actual voltage information and the voltage command is less than a difference between the actual voltage information and the voltage command.

7. The phase and the amplitude improving system of claim 6, wherein the phase compensating program comprises:
   performing an orthogonal operation on the actual voltage information to generate an actual voltage orthogonal information; and
   receiving the phase command information, the actual voltage information and the actual voltage orthogonal information to generate an angle difference, and perform a multiplication operation on the angle difference, a phase compensating gain and an integrator to generate the compensating phase information.

8. The phase and the amplitude improving system of claim 7, wherein the compensating phase information is satisfied the following condition:

$$v_{ph,nth} = \{\sin(n\omega_{fun}t)[V_{fb,amp,nth}\cos(n\omega_{fun}t + \Delta\theta_{fb,nth})] - \cos(n\omega_{fun}t)[V_{fb,amp,nth}\sin(n\omega_{fun}t + \Delta\theta_{fb,nth})]\}.$$

wherein $v_{ph,nth}$ represents the compensating phase information, $\sin(n\omega_{fun}t)$ represents the phase command information, $\cos(n\omega_{fun}t)$ represents a phase command orthogonal information, $V_{fb,amp,nth} \sin(n\omega_{fun}t+\Delta\theta_{fb,nth})$ represents the actual voltage information, $V_{fb,amp,nth} \cos(n\omega_{fun}t+\Delta\theta_{fb,nth})$ represents the actual voltage orthogonal information, $\Delta\theta_{fb,nth}$ represents an angle difference between an actual phase information of the actual voltage information and the phase command information.

9. The phase and the amplitude improving system of claim 7, wherein the amplitude compensating program comprises:
   receiving the amplitude command information, the actual voltage information, the actual voltage orthogonal information and the compensating phase information to perform a subtraction operation to generate an output result; and
   performing another multiplication operation on the output result and an amplitude compensating gain to generate the compensating amplitude information.

10. The phase and the amplitude improving system of claim 9, wherein the compensating amplitude information is satisfied the following condition:

$$v_{fb,amp,nth} = \{\cos(\hat{\theta}_{nth})[V_{fb,amp,nth}\cos(n\omega_{fun}t + \Delta\theta_{fb,nth})] + \sin(\hat{\theta}_{nth})[V_{fb,amp,nth}\sin(n\omega_{fun}t + \Delta\theta_{fb,nth})]\};$$

wherein $v_{fb,amp,nth}$ represents the compensating amplitude information, $\sin(\hat{\theta}_{nth})$ represents the compensating phase information, $\cos(\hat{\theta}_{nth})$ represents a compensating phase orthogonal information, $V_{fb,amp,nth} \sin(n\omega_{fun}t+\Delta\theta_{fb,nth})$ represents the actual voltage information, $V_{fb,amp,nth} \cos(n\omega_{fun}t+\Delta\theta_{fb,nth})$ represents the actual voltage orthogonal information, $\Delta\theta_{fb,nth}$ represents an angle difference between an actual phase information of the actual voltage information and the phase command information.

* * * * *